United States Patent [19]

Kamo et al.

[11] Patent Number: 5,363,251
[45] Date of Patent: Nov. 8, 1994

[54] MAGNETIC RECORDING DEVICE

[75] Inventors: Masayoshi Kamo; Yuzo Maruta; Hiroaki Sando; Takashi Furuhata, all of Kamakura, Japan

[73] Assignee: Mitsubishi Denki Kabushiki Kaisha, Tokyo, Japan

[21] Appl. No.: 923,014

[22] Filed: Jul. 30, 1992

Related U.S. Application Data

[63] Continuation of Ser. No. 509,625, Apr. 13, 1990, abandoned.

[30] Foreign Application Priority Data

Apr. 17, 1989 [JP] Japan ................................ 1-97053
Jun. 8, 1989 [JP] Japan ................................ 1-146472

[51] Int. Cl.$^5$ .......................... G11B 5/02; G11B 5/60; G11B 5/127
[52] U.S. Cl. ....................... 360/55; 360/103; 360/115
[58] Field of Search ............... 360/55, 103, 131, 102, 360/115, 123, 125, 135

[56] References Cited

U.S. PATENT DOCUMENTS

| | | | |
|---|---|---|---|
| 3,258,750 | 6/1966 | Shew | 360/135 |
| 4,351,010 | 9/1982 | Arai | 360/131 |
| 4,580,178 | 4/1986 | Wuori et al. | 360/67 |
| 4,685,012 | 8/1987 | DeWit et al. | 360/125 |
| 4,737,873 | 4/1988 | Desserre | 360/121 |
| 4,911,967 | 3/1990 | Lazzari | 360/135 |
| 4,939,609 | 7/1990 | Zieren et al. | 360/125 |

FOREIGN PATENT DOCUMENTS

| | | |
|---|---|---|
| 0185406 | 6/1986 | European Pat. Off. . |
| 54-11710 | 1/1979 | Japan . |
| 58-212624 | 12/1983 | Japan . |
| 62-121901 | 6/1987 | Japan . |
| 63-76114 | 4/1988 | Japan . |
| 63-191316 | 8/1988 | Japan . |

OTHER PUBLICATIONS

"Technik der Magnetspeicher", F. Winckel, Springer-Verlag, Berlin 1960, pp. 541-543.
"Theory of Magnetic Recording", Masaaki Nishikawa, Nov. 1, 1985, p. 2.

Primary Examiner—Donald Hajec
Assistant Examiner—Won T. C. Kim
Attorney, Agent, or Firm—Wolf, Greenfield & Sacks

[57] ABSTRACT

In a magnetic recording device for magnetically recording Information on a magnetic recording medium by a magnetic head, the magnetic head is so oriented that the magnetic flux leaking at the head gap is at right angles with the direction of relative movement between the magnetic head and the magnetic recording medium and parallel with the surface of the magnet recording medium. The magnetic recording medium may have track portions formed of a magnetic material, and intertrack portions formed of a nonmagnetic material. The magnetic recording medium may alternatively be formed of convex track portions and concave intertrack portions.

2 Claims, 13 Drawing Sheets

F I G. 10B
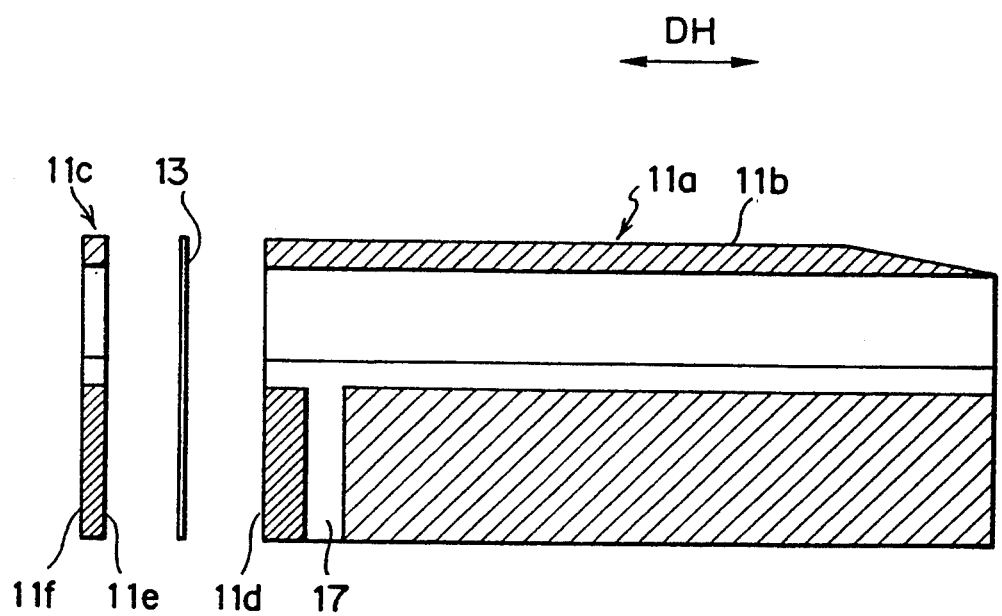

MAGNETIC RECORDING DEVICE

This application is a continuation, of application Ser. No. 07/509,625, filed Apr. 13, 1990 now abandoned.

BACKGROUND OF THE INVENTION

This invention relates to a magnetic recording medium for recording information on and reproducing information from the magnetic recording medium, such as a magnetic disk.

FIG. 1 is a perspective view showing the relationship between the magnetic head and the magnetic recording medium in a conventional magnetic recording device shown, for example, in "Theory of Magnetic Recording" by Masaaki Nishikawa, published by Kabushiki Kaisha Asakura Shoten, November 1985; Drawing No. 1.2. FIG. 2 and FIG. 3 are schematic diagrams showing the principle of recording and the principle of reproduction in the magnetic recording device of FIG. 1. In the figures, a magnetic head 4 comprises a core 1 with a gap S and a coil 2 wound on the core 1. A magnetic recording medium 5 is moved relative to the magnetic head 4 in the direction indicated by arrow D. An electrical circuit 6 is for passing a write current I through the coil 2 to record information, and reproducing information from the read voltage derived from the coil 2. Information is written on the magnetic recording medium 5 along a track.

The principle of recording information on the magnetic recording medium 5 will now be described with reference to FIG. 2. The magnetic recording medium 5 is moved relative to the magnetic head 4 in the direction D In FIG. 2. An alternating current I is made to flow from the electric circuit 6 through the coil 2 In accordance with the Information to be recorded. The coil 2 and the core 1 generates an alternating magnetic field (magnetic flux) F in the core 1 in compliance with the alternating current I. The alternating magnetic field F leaks at the gap 3 and reaches the magnetic recording medium 5. The magnetic recording medium 5 is magnetized into the direction indicated by arrow M in FIG. 2 responsive to the alternating magnetic field F that leaks at the gap 3. Thus, information is recorded on the magnetic recording medium 5.

The principle of reproducing information from the magnetic recording medium 5 will now be described with reference to FIG. 3. As shown in FIG. 3, part of the magnetic flux F emanated from the magnetic recording medium 5 enters the core 1 and interlinks the coil 2. When the magnetic recording medium 5 is moved in the direction D in FIG. 3, the magnetic flux F interlinking the coil 2 varies over time, and a voltage is therefore induced in the coil 2 in accordance with the Faraday's law. When the magnetic head 4 passes the part of the magnetic recording medium 5 where the magnetization is reversed, the variation of the magnetic flux F interlinking the coil 2 becomes the maximum, so that the voltage induced in the coil 2 becomes the maximum. By detecting the position of the maximum voltage through electrical processing in the electrical circuit 6, the position of reversal of the magnetization on the magnetic recording medium 5 is known, and information is reproduced from the magnetic recording medium 5.

When the amount of information to be recorded and reproduced is increased and it is required that magnetization be made more densely on the magnetic recording medium 5, the reproduction output is lowered due to demagnetization effect, with the result that reliability of the magnetic recording device is lowered.

This will be explained with reference to FIG. 4A and FIG. 4B, which illustrate the demagnetization effect associated with the magnetic recording device of FIG. 1. FIG. 4A shows the magnitude of the alternating magnetic field F leaking at the gap 3 during recording against the position on the magnetic recording medium 5. FIG. 4B shows the magnitude of the magnetization at the part of the reversal of magnetization on the magnetic recording medium 5 against the position on the magnetic recording medium 5.

For recording information, an alternating magnetic field F with the width of reversal being zero (i.e., which varies stepwise) as shown in FIG. 4A is generated, so that the magnetization shown in FIG. 4B should also have a zero width of reversal. However, because of polarization magnetic charge appearing in the region of reversal of magnetization, demagnetizing magnetic field F is generated in front of and at the back of the position of reversal of magnetization, tending to expand the width of reversal of magnetization. The width of reversal of magnetization is therefore expanded self-consistently. When the interval of reversal of magnetization on the magnetic recording medium 5 is long, the increase in the width of reversal of magnetization is negligible. When the interval of reversal of magnetization is short, the effect cannot be neglected. As a result, error in the reading of the position of the reversal of magnetization on the magnetic recording medium 5 may occur, and the reliability of the magnetic recording device is lowered.

SUMMARY OF THE INVENTION

An object of the invention is to eliminate the above problems.

Another object of the invention is to restrain the increase in the width of reversal of magnetization due to demagnetization effect, and to improve the reliability.

A magnetic recording device according to the invention is for magnetically recording information on a magnetic recording medium. It comprises:

a magnetic head having a core with a gap, and a coil wound on the core;

means for causing relative movement between the magnetic head and the magnetic recording medium such that part of the magnetic recording medium and the gap are adjacent each other;

electrical circuit means connected to the coil to supply an electrical current to the coil to generate a magnetic flux F across the gap for writing information on the magnetic recording medium, or to receive a voltage induced in the coil due to magnetic flux F from the information recorded on the magnetic recording medium for reading information.

The magnetic recording device according to the invention is characterized in that the means for causing relative movement holds the magnetic head and the magnetic recording medium in such a manner that the direction of the magnetic flux F passing the gap is at right angles with the direction of the relative movement and is parallel with the surface of the magnetic recording medium.

In one embodiment of the invention, the magnetic recording medium has track portions formed of a magnetic material, and intertrack portions which are parallel with the track portions to separate the adjacent tracks are formed of a nonmagnetic material.

In another embodiment of the invention, the recording medium has track portions which are convex toward the magnetic head, and intertrack portions which are parallel with the track portions to separate the adjacent tracks are concave toward the magnetic head.

In the magnetic recording device according to the invention, the orientation of the magnetic head is such that magnetic flux F passing the gap of the magnetic head is at right angles with the relative movement between the magnetic head and the magnetic recording medium and is parallel with the surface of the magnetic recording medium. As a result, the interval of reversal of magnetization on the magnetic recording medium can be longer than the width of the core of the magnetic head, and no polarization magnetic charge appears at the part of reversal of magnetization, so that no demagnetization field is generated, and there will be no expansion of the width of reversal of magnetization.

Moreover, where the intertrack portions of the magnetic recording medium are formed of a nonmagnetic material, the intertrack portions will not be magnetized by the magnetic head. Consequently, interference between tracks is minimized.

Where the intertrack portions of the magnetic recording medium are concave, influence from the magnetic flux F leaking at the gap is small, and the intertrack portions are hardly magnetized by the magnetic flux F leaking at the gap. Consequently, interference between tracks is minimized.

BRIEF DESCRIPTION OF THE EMBODIMENTS

FIG. 10B is a cross sectional view along the cross section AA′BB′ in FIG. 9, with the members being separated from each other in the direction of arrow DH.

DETAILED DESCRIPTION OF THE PREFERRED EMBODIMENTS

Figure 5:
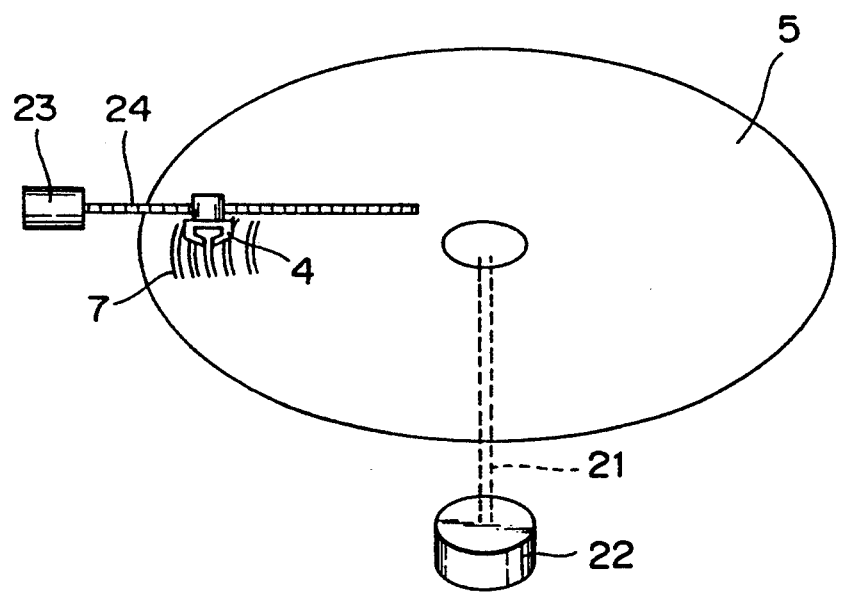
FIG. 5 is a perspective view showing a magnetic recording device of an embodiment-of the invention.
Figure 6:
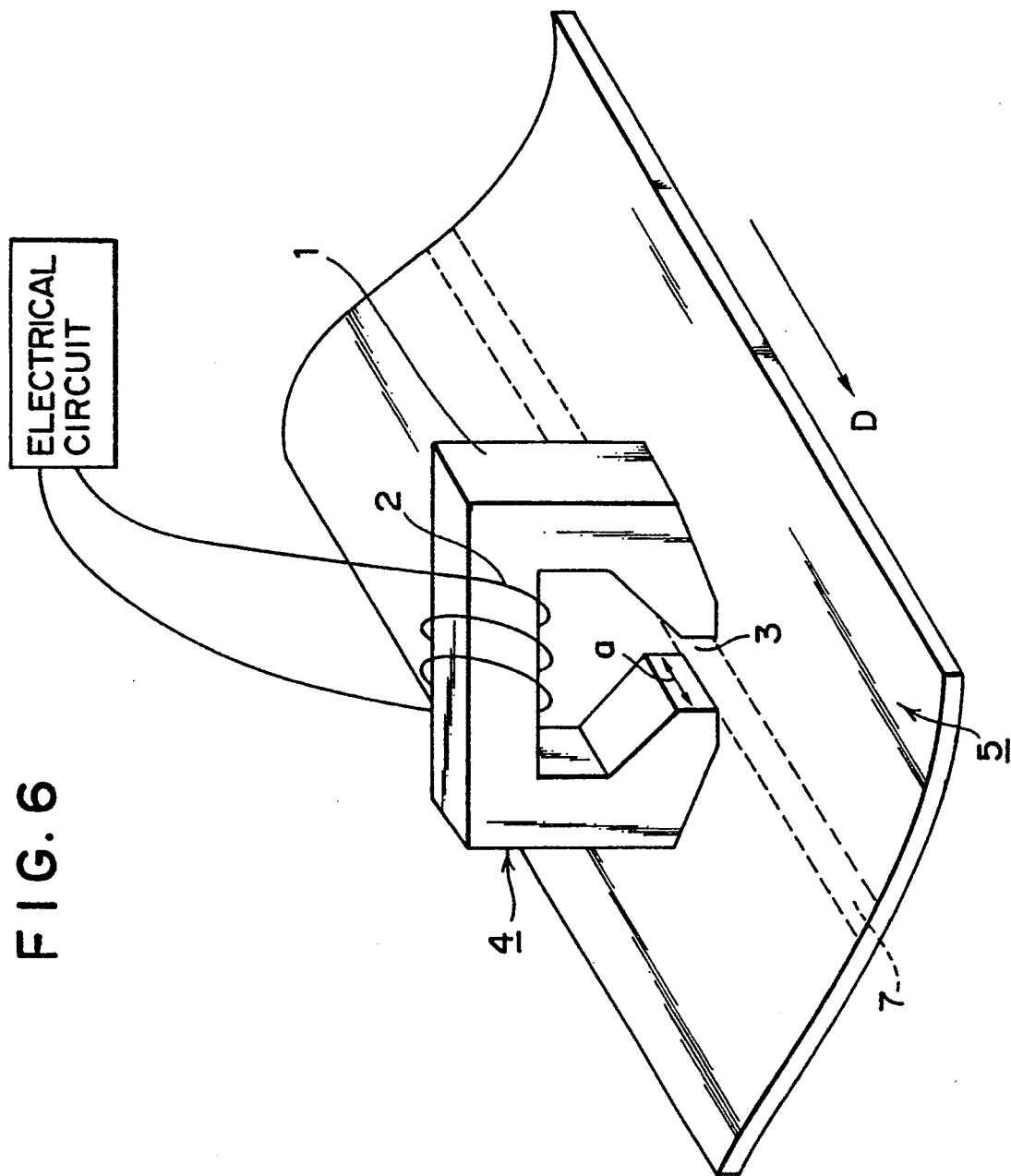
FIG. 6 is a perspective view showing the magnetic head and the magnetic recording medium in the magnetic recording device of FIG. 5.
Figure 7:
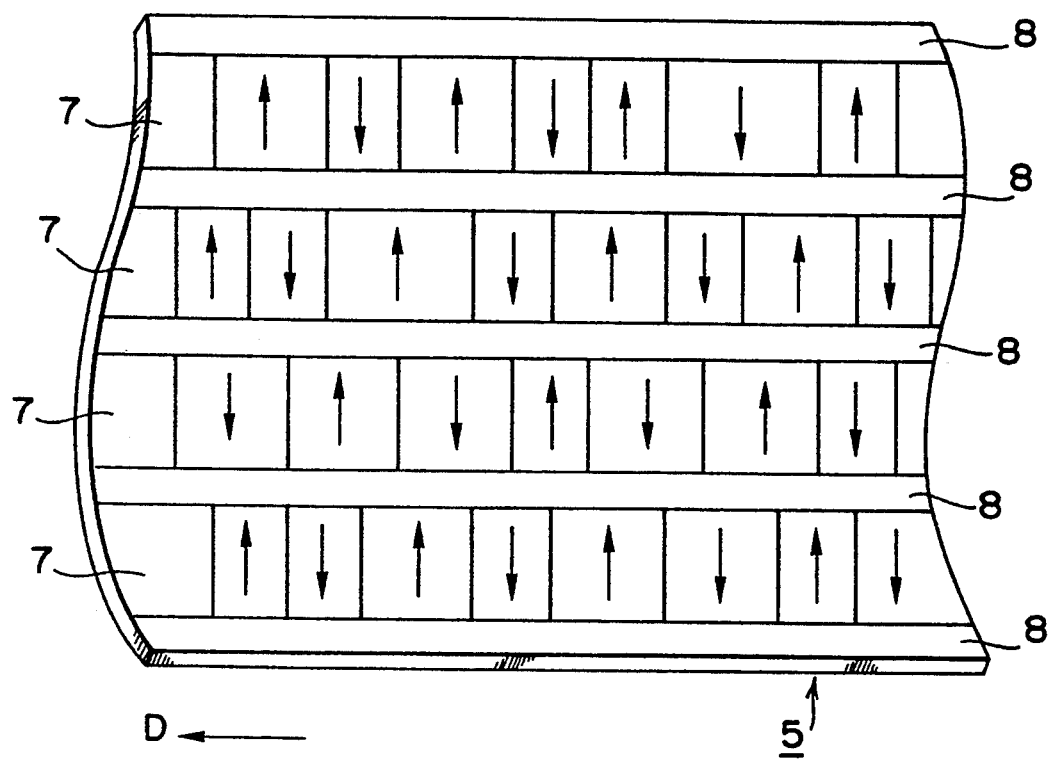
FIG. 7 is a schematic diagram showing magnetization on the magnetic recording medium in the magnetic recording device of FIG. 6.

FIG. 5 is a schematic view illustrating a magnetic recording device of an embodiment of the invention. FIG. 6 is a perspective view showing the magnetic head and the magnetic recording reedlure in the magnetic recording device of FIG. 5. FIG. 7 is a schematic diagram illustrating the magnetization of a magnetic recording reed lure in the magnetic recording device of FIG. 5. As illustrated, a magnetic head 4 comprises a core 1, a coil 2 wound on the core 1 with a predetermined number of turns, and a gap 3 provided in the core 2 having a predetermined gap width.

A magnetic recording medium 5 such as a magnetic disk is moved relative to the magnetic head 4. In the illustrated embodiment, the magnetic recording medium 5 is a disk and is mounted on a spindle 21 which is turned by a motor 22 so part of the disk 5 is moved in the circumferential direction relative to the magnetic head 4 for sequential access along one of the tracks 7. The magnetic head 4 on the other hand is moved in the radial direction of the disk 5 by a mechanism which includes another motor 23 and a threaded rod 24 for accessing the desired track.

An electrical circuit 6 is for passing a write current through the coil 2 to record information, and reproducing information from the read voltage derived from the coil 2.

When the magnetic recording medium 5 is a magnetic disk, the tracks 7 may consist of a plurality of concentric lines or a single continuous spiral line. Intertrack portions 8 are disposed between and extending parallel with the tracks 7 to separate the adjacent tracks 7. In the illustrated embodiment, the tracks 7 are formed of a magnetic material, while the intertrack portions 8 are formed of a nonmagnetic material. Accordingly, the intertrack portions 8 are never magnetized.

The operation of the magnetic recording device of this embodiment of the invention will now be described. In the magnetic recording device according to the invention, as shown in FIG. 6, the orientation of the magnetic head 4 is such that magnetic flux F passing the gap 3 of the magnetic head 4 is at right angles with the relative movement between the magnetic head 4 and the magnetic recording medium 5 and is parallel with the surface of the magnetic recording medium 5. As is seen from FIG. 6 and FIG. 7, the interval of reversal of magnetization on the magnetic recording medium 5 is greater than the width (a in FIG. 6) of the core 1 of the magnetic head 4. No polarization magnetic charge appears at the part of reversal of magnetization, so that no demagnetization field is generated, and there will be no expansion of the width of reversal of magnetization.

Moreover, the intertrack portions 8 of the magnetic recording medium 5 are formed of a nonmagnetic material, so that the intertrack portions 8 will not be magnetized by the magnetic head 4. Consequently, interference between adjacent tracks 7 is minimized.

Figure 1:
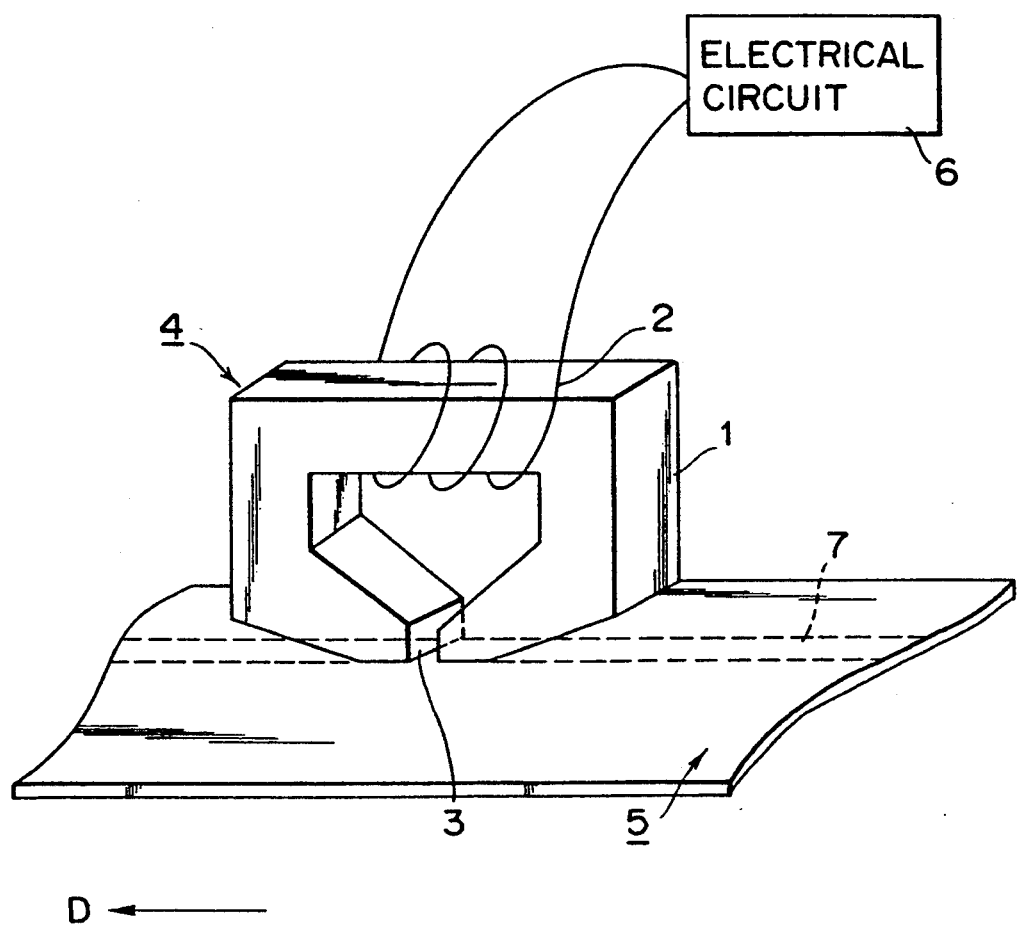
FIG. 1 is a perspective view showing the relationship between the magnetic head and the magnetic recording medium in the magnetic recording device in the prior art.
Figure 2:
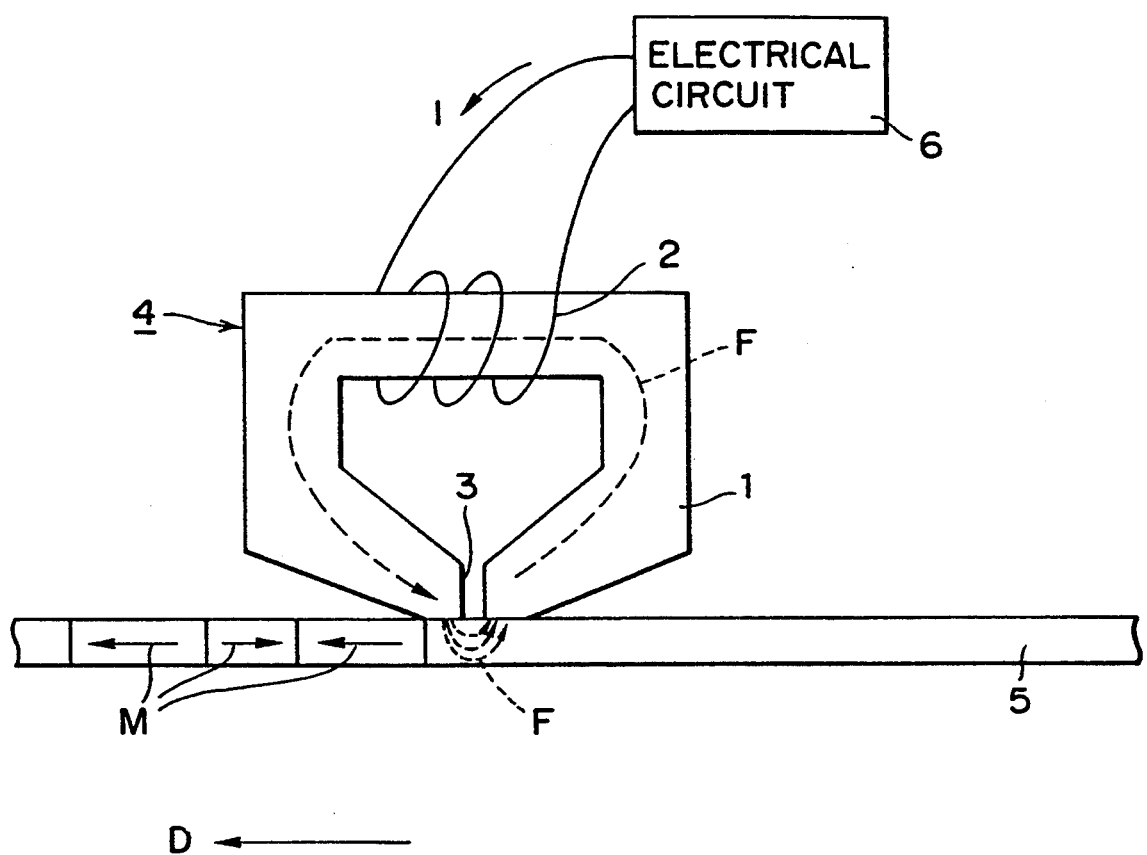
FIG. 2 and FIG. 3 are schematic diagrams showing the principle of recording and the principle of reproduction in the magnetic recording device of FIG. 1.
Figure 3:
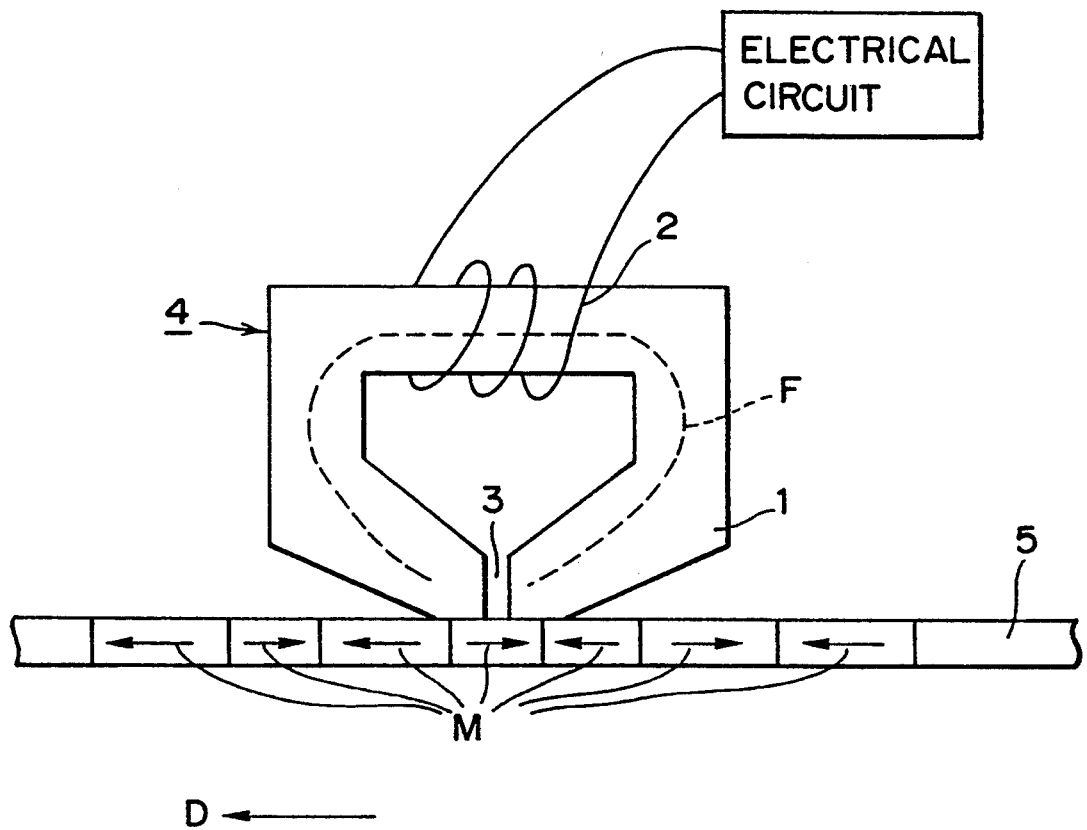
Figures 4A, 4B:
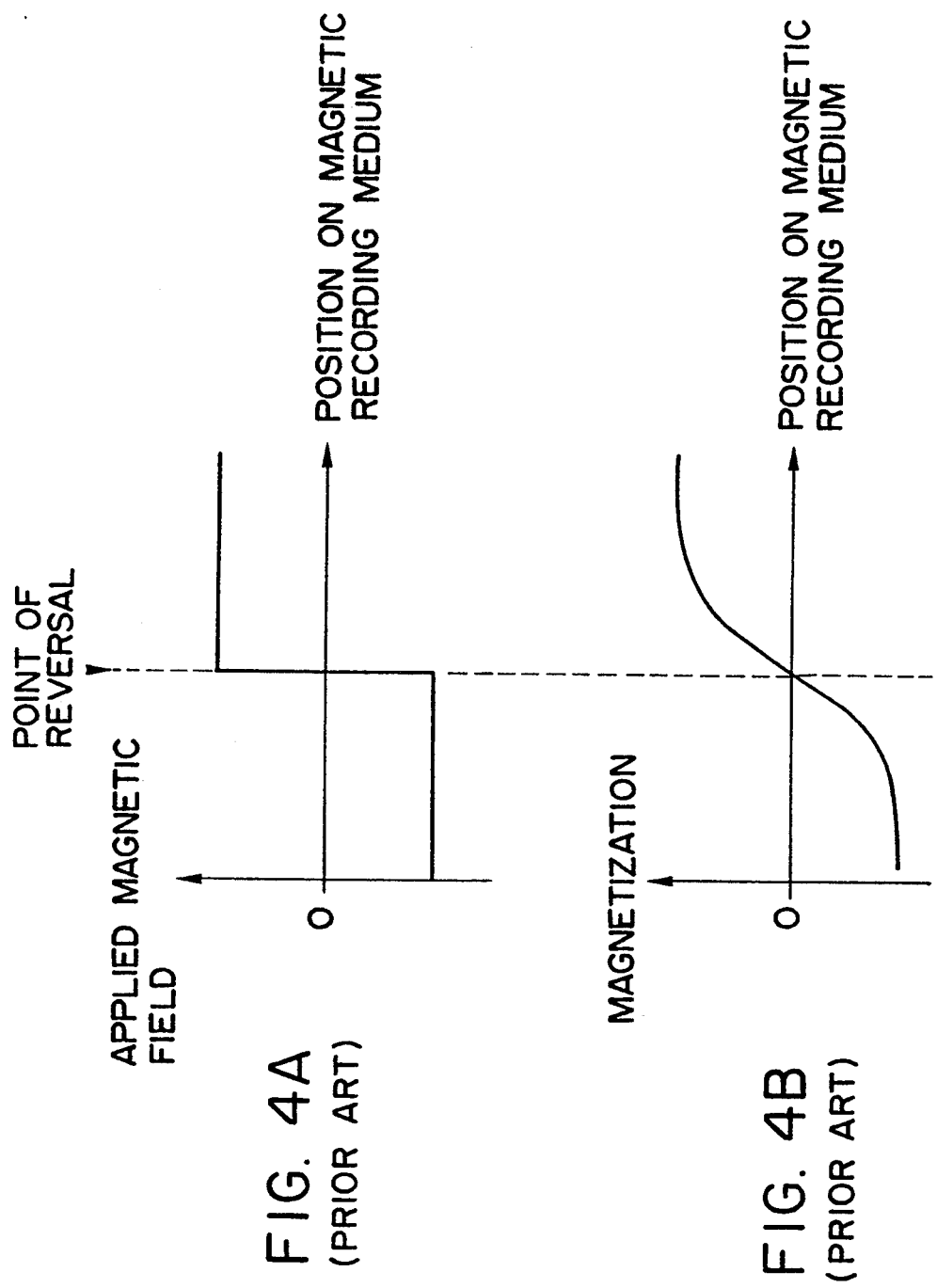
FIG. 4A and FIG. 4B are diagrams illustrating the demagnetization effect which is a problem in the magnetic recording device of FIG. 1.

The operation of recording information on and reproducing information from the magnetic recording medium in the magnetic recording device according to the invention differs from that of the prior art in that the orientation of the magnetic head 4 is at right angles with the direction of the relative movement between the magnetic head 4 and the magnetic recording medium 5, but recording of information on the magnetic recording medium 5 can be accomplished using the magnetic head 4, and reproduction of information from the magnetic recording medium 5 can be accomplished using the magnetic head 4, in the same manner as described with reference to FIG. 2 and FIG. 3.

Figure 8:
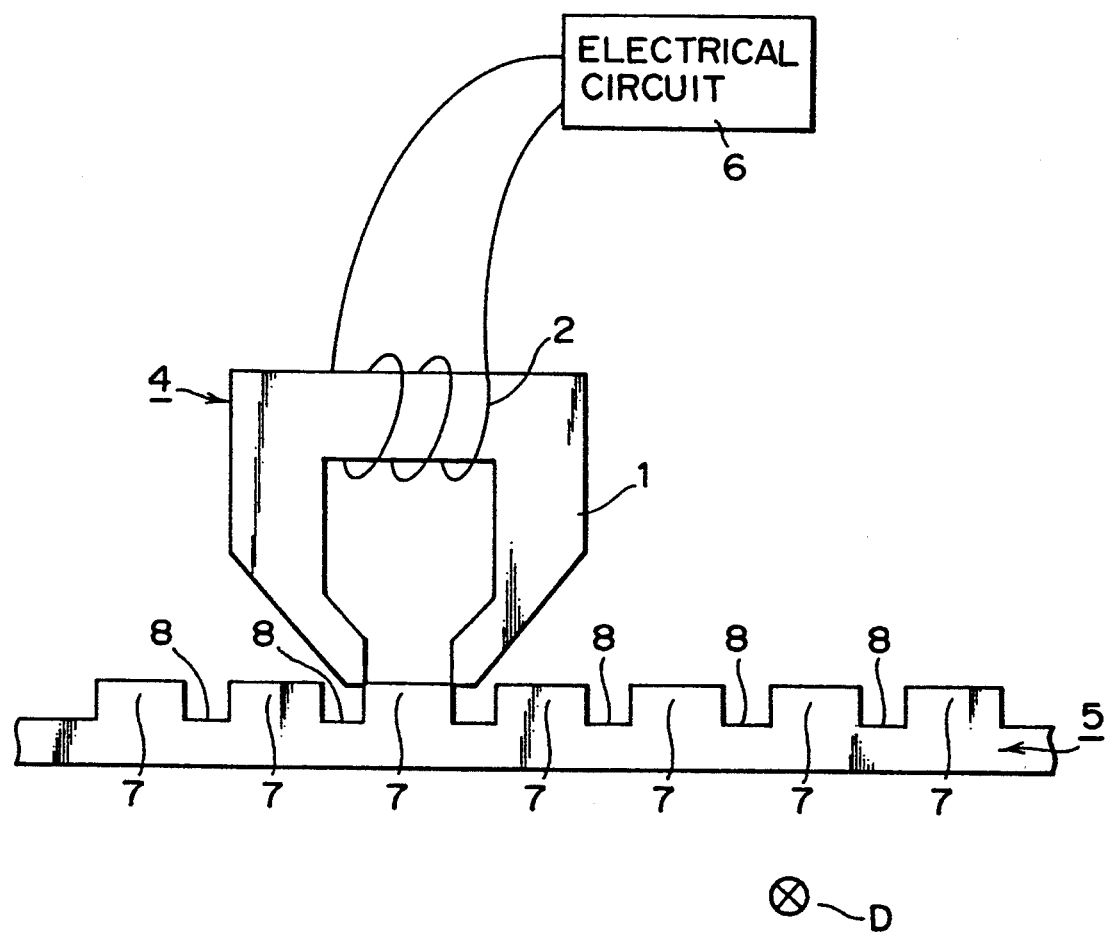
FIG. 8 is a side view showing the relationship between the magnetic head and the magnetic recording medium in the magnetic recording device of another embodiment of the invention.

FIG. 8 is a side view showing the relationship between the magnetic head and the magnetic recording medium in the magnetic recording device of another embodiment of the invention. The magnetic recording device shown in FIG. 8 is similar to the magnetic recording device shown in FIG. 6 in that the orientation of the magnetic head 4 is such that magnetic flux F passing the gap 3 of the magnetic head 4 is at right angles with the relative movement between the magnetic head 4 and the magnetic recording medium 5 and is parallel with the surface of the magnetic recording medium 5. Accordingly, in the same way as described with reference to FIG. 6 and FIG. 7, no polarization magnetic charge appears at the part of reversal of magnetization on the magnetic recording medium 5, so that no demagnetization field is generated, and there will be no expansion of the width of reversal of magnetization.

Moreover, the track portions 7 on which data are written are convex toward the magnetic head 4 as shown in FIG. 8, and the intertrack portions 8 between the tracks 7 are concave. That is, the intertrack portions 8 consist of elongated grooves of a constant width and a constant depth while the tracks 7 consist of strips of convex parts with a constant width between adjacent grooves. Accordingly, the concave parts at the intertrack portions 8 are separated by the depth of the concave portions from the magnetic head 4, and is hardly influenced by the magnetic flux F leaking at the gap 3, and hence hardly magnetized by the magnetic flux F leaking at the gap 3. Consequently, interference between the tracks 7 is minimized.

Figure 9:
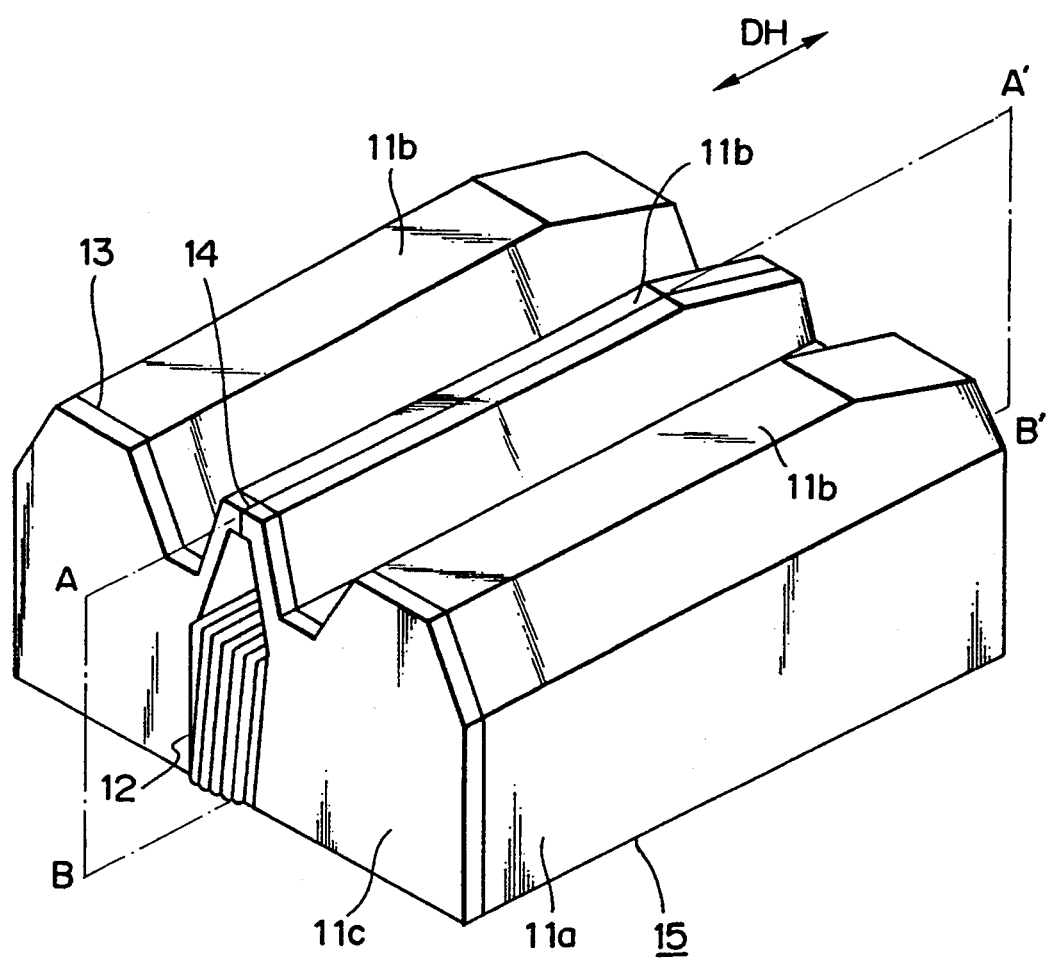
FIG. 9 is a diagram showing the structure of a magnetic head of an embodiment of the invention.
Figure 10A:
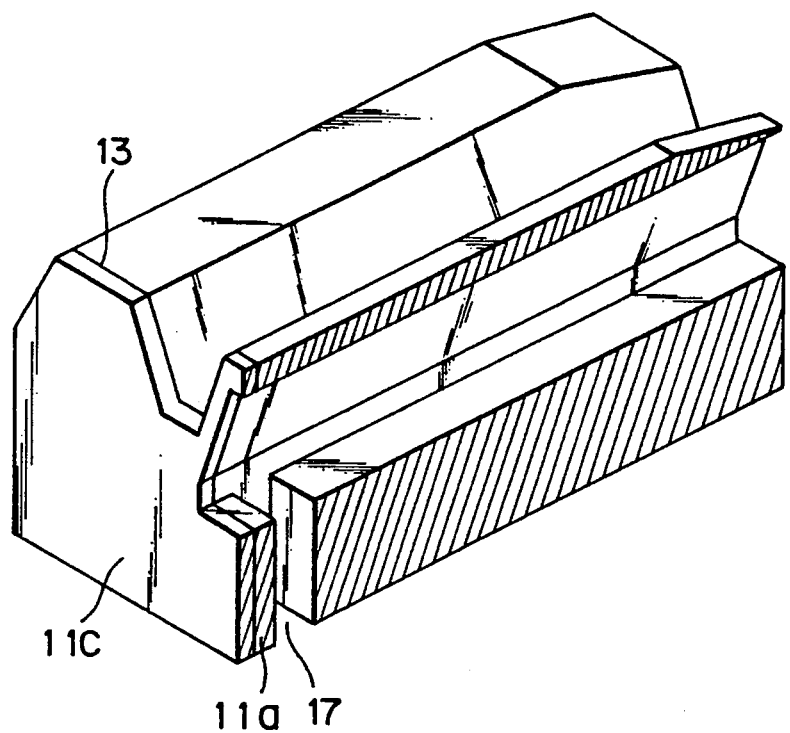
FIG. 10A is a cross sectional perspective view along the cross section AA′BB′ in FIG. 9.
Figure 11:
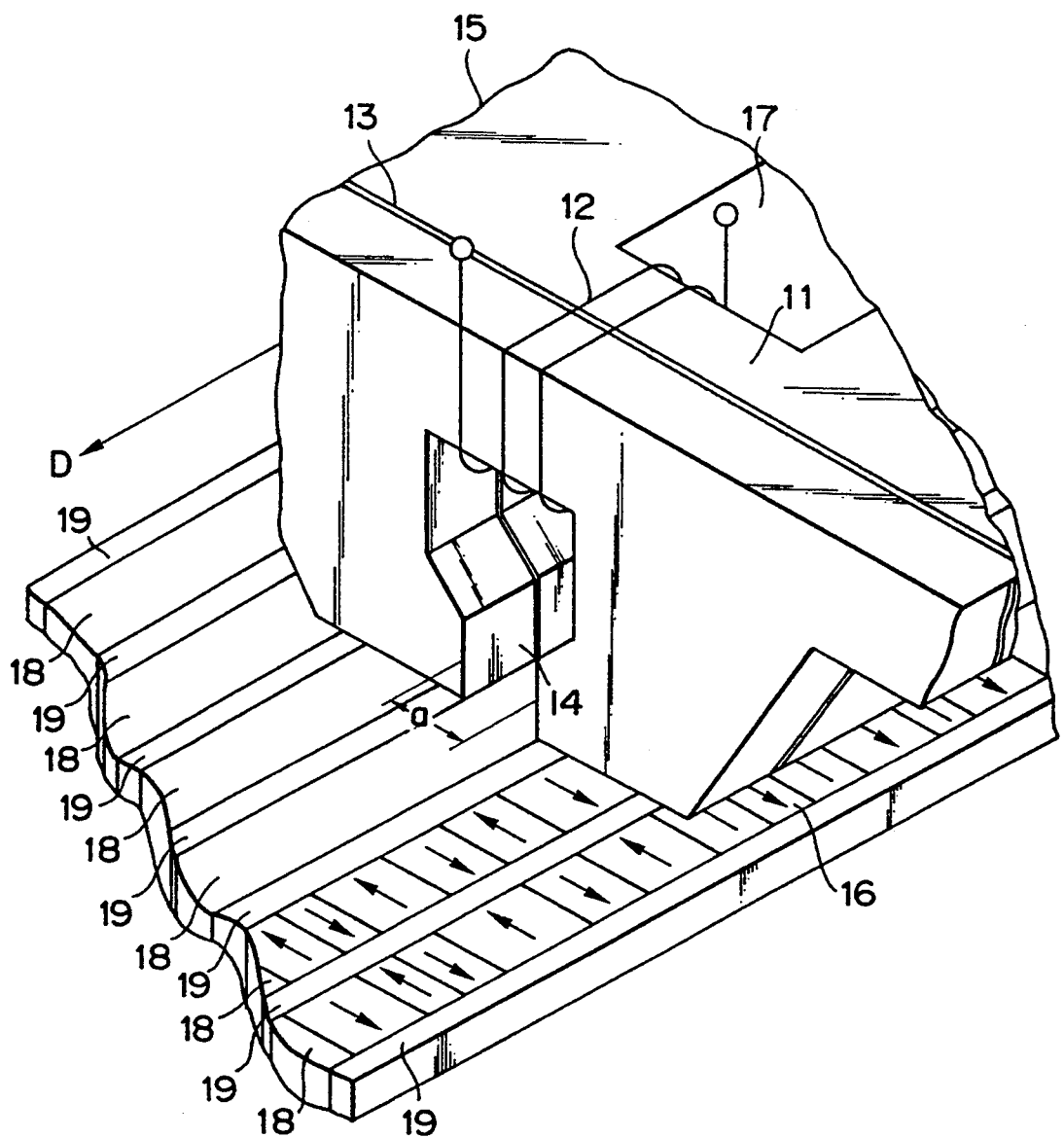
FIG. 11 is a perspective view showing the relationship between the magnetic head and the magnetic recording medium in FIG. 9.
Figure 12:
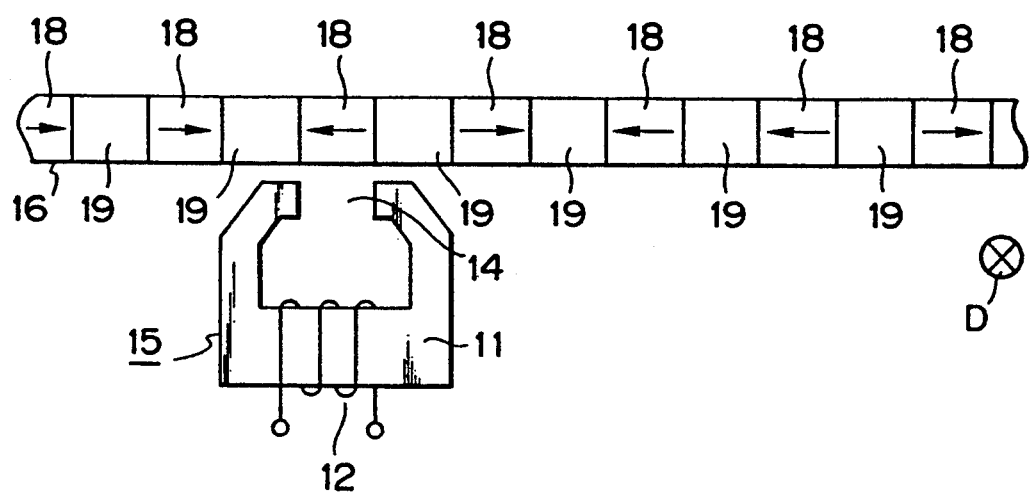
FIG. 12 is a schematic diagram showing magnetization on the magnetic recording medium magnetized by the magnetic head of FIG. 9.

A preferred example of a magnetic head that can be used in the magnetic recording device of the invention will now be described with reference to FIG. 9 to FIG. 12. The magnetic head 15 illustrated is a floating type magnetic head and is suitable for use in a fixed magnetic disk drive device. FIG. 9 is a view as seen from the side of the gap 14. FIG. 10A is a cross sectional perspective view along the cross section AA'BB' in FIG. 9. FIG. 10B is a cross sectional view along the cross section AA'BB' in FIG. 9, with the members being separated from each other in the direction of arrow DH. FIG. 11 is a perspective view showing part of the magnetic head and the magnetic recording medium in FIG. 9, with the head being turned upside down. FIG. 12 is a diagram showing magnetization on the magnetic recording medium magnetized by the magnetic head of FIG. 9.

In the figures, the magnetic head 15 comprises a head block 11 formed of a first body 11a of a nonmagnetic material and a second body of a nonmagnetic material 11c. The first body 11a is elongated in a first direction DH which is the direction of the relative movement between the magnetic head 15 and the magnetic recording medium 16. The first body 11a has sliding surfaces 11b extending along the first direction. Tile sliding surfaces 11b are disposed to face the magnetic recording medium 15. Tile first body 11a has a flat surface 11d at a rear end, the end adjacent the second body 11c, and a coil opening 17 near the flat surface 11d on the rear end and extending parallel with the flat surface 11d at the rear end. The second body 11c is short or thin in the first direction DH and has a flat surface 11e at the front side, the side adjacent the first body 11a. The second body 11c has a rear side 11f on the side opposite to the front side.

A magnetic film 13 having a gap 14 is clamped between the flat surfaces 11d and 11e of the first body 11a and the second body 11c. A coil 12 is wound on the parts of the first and second bodies 11a and 11c between which the magnetic film 13 is clamped, with the coil 12 being passed through the coil opening 17, and over the rear side 11f of the second body 11c.

The magnetic head 15 of the embodiment of FIG. 9 to FIG. 12 was assumed to be a floating-type magnetic head used in a fixed magnetic disk drive device. But the invention is applicable to a contact type magnetic head used for example in a flexible magnetic disk drive device and a video tape recorder.

As has been described, according to the magnetic recording device of the invention, the magnetic head is so oriented that the direction of magnetization on the magnetic recording medium is at right angles with the direction of the relative movement between the magnetic head and the magnetic recording medium, and parallel with the surface of the magnetic recording medium. Accordingly, demagnetization effect on the parts of reversal of magnetization on the magnetic recording medium is reduced. Recording on the magnetic recording medium by magnetization reversal can be easily achieved more densely and more reliably. The reliability of the magnetic recording device is therefore improved.

What is claimed is:

1. A magnetic recording device for magnetically recording information on a magnetic recording medium, comprising:

a magnetic head including a core having means defining a gap, and a coil wound on the core;

means for causing relative movement between said magnetic head and said magnetic recording medium such that part of said magnetic recording medium and said gap are adjacent each other;

electrical circuit means connected to said coil to supply an electrical current to said coil to generate a magnetic flux F across said gap for writing information on said magnetic recording medium, or to receive a voltage induced in said coil due to magnetic flux F from the information recorded on said magnetic recording medium for reading information;

wherein said means for causing relative movement includes means for holding said magnetic head and said magnetic recording medium in relative position so that the direction of the magnetic flux across said gap is oriented both at a right angle to the direction of said relative movement and also parallel with the surface of said magnetic recording medium, wherein said magnetic head comprises a first body of a non-magnetic material, a second body of a non-magnetic material, and a magnetic film having said gap and clamped between said first body and said second body, said magnetic film constituting said core and said coil being wound on part of said first and second bodies between which said magnetic film is clamped, and wherein said first body has a first flat surface adjacent the second body and a coil opening near the first flat surface and extending parallel with the first flat surface;

the second body has a second flat surface adjacent the first body;

said magnetic film is clamped between the first and second flat surfaces respectively of said first body and said second body, wherein said magnetic film defines a plane substantially parallel to said first and second flat surfaces;

said coil is wound on the parts of the first and second bodies between which the magnetic film is clamped, with the coiled being passed through the coil opening, wherein the direction of the coil windings within the coil opening is parallel to the plane defined by said magnetic film.

2. The device of claim 1, wherein said first body is elongated in the direction of the relative movement between the magnetic head and the magnetic recording medium and has sliding surfaces extending along the direction of relative movement and disposed to face the magnetic recording medium;

the second body is relatively short in the direction of relative movement and has a third surface free of said first surface;

said coil is passed through said opening and over said third surface of said second body.

* * * * *